United States Patent [19]

Amano

[11] Patent Number: 5,689,496
[45] Date of Patent: Nov. 18, 1997

[54] OPTICAL RECORDING MEDIUM HAVING SPIRAL TRACKS FORMED WITH A TURNING ANGLE OF MORE THAN 360°

[75] Inventor: Kenichi Amano, Kanagawa, Japan

[73] Assignee: Sony Corporation, Tokyo, Japan

[21] Appl. No.: 714,974

[22] Filed: Sep. 17, 1996

[30] Foreign Application Priority Data

Sep. 30, 1995 [JP] Japan .................. 7-276704

[51] Int. Cl.⁶ .................. G11B 7/24; G11B 3/70
[52] U.S. Cl. .................. 369/275.4; 369/278; 369/279
[58] Field of Search .................. 369/275.4, 275.3, 369/275.1, 272, 273, 277, 278, 279, 280, 282, 292; 430/320, 321; 478/64.1

[56] References Cited

U.S. PATENT DOCUMENTS

| | | | |
|---|---|---|---|
| 3,656,760 | 4/1972 | Symmes | 369/278 |
| 4,329,575 | 5/1982 | Roach | 369/273 |
| 4,341,952 | 7/1982 | John et al. | 369/273 |
| 4,803,677 | 2/1989 | Yamaguchi et al. | 369/279 |

*Primary Examiner*—Tan Dinh
*Attorney, Agent, or Firm*—Limbach & Limbach L.L.P.

[57] ABSTRACT

An optical recording medium enables an optical pickup to quickly access a plurality of items of information progressing concurrently or to be selected simultaneously. By provision of spiral multitrack formed by multiple winding of a plurality of tracks in a first recording region and concentric-circle track formed in a second recording region adjacent to the first recording region, this invention can implement an optical recording medium in which the distance from the concentric-circle track to each track of the spiral multitrack is shortened, thus enabling an optical pickup to quickly access a desired track at a track jump.

16 Claims, 7 Drawing Sheets

ROTATING DIRECTION
OF THE DISK

OPTICAL RECORDING MEDIUM HAVING SPIRAL TRACKS FORMED WITH A TURNING ANGLE OF MORE THAN 360°

BACKGROUND OF THE INVENTION

1. Field of the Invention

This invention relates to an optical recording medium, and is applicable to, for example, a compact disk (CD).

2. Description of the Related Art

So far, a compact disk has been so constructed that pits are molded on one side of the compact disk and placed along a spiral track. Such a type of compact disk is arranged so that laser light is irradiated onto the pits by means of optical pickup, a signal is detected in accordance with a change in the quantity of their reflected light and information is read out. The constitution of this compact disk will be described referring to FIGS. 1A and 1B.

First, as shown in FIG. 1A, the information track of a compact disk i comprises one line of spiral track 2. In addition, as shown in FIG. 1B, information recorded on this spiral track 2 is managed for each frame 3 and this frame 3 is so arranged as to constitute the spiral track 2 in series. This frame 3 comprises a synchronizing signal 4, a control signal 5 and a data section 6 on which data and error correction data are recorded.

Here, the synchronizing signal 4 is a signal for making the linear velocity of the compact disk 1 rotating by a servo circuit of Constant linear velocity (CLV) scheme constant, whereas the control signal 5 is a signal for recording track numbers for identifying a plurality of data recorded in the data section 6, and time information for continuous playback and the like.

Meanwhile, in the innermost portion of a compact disk 1, the region called table of contents (TOC) area is provided, in which information concerning track numbers or index numbers over the whole compact disk 1 are recorded.

Furthermore, with the scheme called compact disk interactive (CD-I) as a developmental type of compact disk 1, image information, included in information to be dealt with, is recorded, while even written information and continuous image information are so arranged as to be also recorded in a scheme called CD-ROM. Like these, in recent years, it has become general that programs for game software or the like are recorded in a CD-ROM and access methods to the information recorded in these recording medium are basically the same. Accordingly, compact disks, including CD-I, CD-ROM and the like, are described hereinafter.

On the other hand, the playback system of a compact disk 1 is so arranged as to first read out information in the TOC area and store it into the memory in the playback system, thereby enabling any one of multiple items of information (programs) recorded over the whole compact disk 1 to be accessed on the basis of the recorded track number or index number.

In addition, for radial movement of an optical pickup on the playback system side, a fine feed mechanism is often employed by a double-axis actuator and a coarse feed mechanism called thread feed by the tracking servo mechanism.

As shown in FIG. 2, an axial-slide type double-axis actuator 10 comprises a stationary support 16, incorporating a bearing (not shown) fixed at the center, an objective lens 11 mounted off-centered, a coil bobbin 14 with a tracking coil 12 and a focusing coil 13 wound therearound and a sliding axis 15 vertically erected at the center, as well as tracking magnets 17, 18 provided corresponding to the coil bobbin 14 around the sliding axis 15, and focusing magnets 19, 20.

This double-axis actuator 10 is arranged so that the coil bobbin 14 can be moved up and down in the directions of the arrows a and b and rotated around the sliding axis 15 in the direction of the arrows c and d as well by allowing a driving current to flow through the tracking coil 12 and the focusing coil 13.

Accordingly, the double-axis actuator 10 is arranged so that the objective lens 11 can be moved toward the focus by moving the coil bobbin 14 up and down from the stationary support 20 in the directions of the arrows a and b and moreover can be moved toward the tracking by rotating the coil bobbin 14 in the direction of the arrows c and d.

At this time, since the moving distance of the objective lens 11 toward the tracking is on the order of ±0.3 mm, the number of tracks that the optical pickup can traverse is about 200 respectively to both directions. The technique of, so-called track-jump, moving the optical pickup to some track apart by one track or several tracks within this range has also been employed routinely in recent years. Like this, the double-axis actuator 10 is arranged so that the optical pickup can be quickly moved radially within the moving distance of the objective lens 11.

In addition, the tracking servo mechanism is a mechanism for moving the double-axis actuator 10 mentioned above and the optical pickup comprising a laser diode and a light sensor over the distance of about 35 mm from the innermost circumference section (read-in section) to the outermost circumference section (read-out section).

As shown in FIG. 3, in the tracking servo mechanism 30, a guide axis 32 and a feed screw 33 disposed respectively in parallel with the compact disk 1 rotated by a spindle motor 31 are supported on a chassis (not shown), and fitted to the guide axis 32 and a feed screw 33 is the optical pickup 34. And, a feed motor 35 transmits the rotating force through reduction gears 36 to the feed screw 33 to rotate it, so that the optical pickup 34 fitted to the feed screw 33 can move in parallel over the entire radial length.

Thus, in the playback system, the control of the optical pickup 34 by use of the fine feed mechanism by the above double-axis actuator 10 and the coarse feed mechanism by the tracking servo mechanism 20 enables a track jump of round 100 tracks and a movement of compact disk 1 over the entire radial length to be completed in several msec and several hundred msec, respectively.

Meanwhile, since various types of information recorded on the compact disk 1 are identified by the track number or index number, the component unit of information, for example, with music information, it is widely carried out to make a music number and a track number correspondent to each other and to make a track number correspondent to a movement or phrase.

In this case, since music information is continuous in time, an access of the optical pickup 34 to a specified music number or phrase is arranged to be made by the steps of finding the time information of the track number or index number for a specified music number or phrase from the TOC area, finding the time information at the current position of the optical pickup 34, and radially moving the optical pickup 34 by the time difference between the two items of time information.

Previously, the position of the information to be accessed was distant for the position of the optical pickup 34, there was a problem that, in the worst case, a movement of the optical pickup 34 from the innermost circumference portion to the outermost circumference portion or reversely from the outermost circumference portion to the innermost circumference portion is required and the access time becomes much longer.

In addition, recently, while various types of TV game devices and tools using a compact disc (CD-ROM) as recording medium of programs for game software are made practicable, most of TV games are so arranged as to progress interactively by switching screens and effect sounds in response to the manipulation of a user.

At that time, unless a TV game device can instantaneously respond to the manipulation, e.g., control-button pressing, of a user and switch screens or effect sounds, the interest of a user might decrease significantly and the merchantability of game devices might be injured.

As one example, a case will be considered that pressing any one of three A, B and C buttons singly leads to the respective development of the story A, the story B and the story C as an animation. It is trusted to the intention of a game maker to which part in the whole story of a game the scene for selection of three buttons is set. Accordingly, a game maker can also previously set the scene for selection in such a manner that the optical pickup 34 can be provided at an appropriate position to an access, for example, to the story A.

Or, it is entrusted to the intention of a compact disk maker at which position the story A, the story B and the story C are recorded. Accordingly, a compact disk maker can also record the story A, the story B and the story C, for example, at neighboring positions.

Then, as shown in FIGS. 4A and 4B, a compact disk maker arranges the positions of recording so that recording is performed from the innermost circumference side of the compact disk i in the sequence of the story A, the story B and the story C and the access time of the optical pickup 34 is shortened. However, when the optical pickup 34 is situated between the story C and the story A, an instantaneous access can be made only to the story A but otherwise the movement of the optical pickup 34 corresponding to the amount of information corresponding to the story A or the story C is inevitable. Accordingly, there were problems that it takes much time for the optical pickup 34 to access the story B or the story C and screens or effect sounds cannot be instantaneously switched in response to a press of the control button.

In addition, as shown in FIG. 4C, when, during the concurrent progress of the story A and the story C, either story can be chosen and displayed by pressing the button A or the button C, a required movement of the optical pickup 34 between A1 and C1 has produced problems that a switching to the display of a selected story cannot be made until the movement of the optical pickup 34 is completed and that screens or effect sounds cannot be switched in an instantaneous response to a press of the control button.

SUMMARY OF THE INVENTION

In view of the foregoing, an object of this invention is to provide an optical recording medium enabling a quick access of an optical pickup by a track jump to be effected to a plurality of items of information progressing concurrently or to be simultaneously selected.

The foregoing object and other objects of the invention have been achieved by the provision of an optical recording medium in which a spiral multitrack formed with a plurality of tracks wound multiply in a first recording region and a concentric-circle track formed in a second recording region adjacent to the first recording region.

The provision of spiral multitrack formed with a plurality of tracks wound multiple times in a first recording region and concentric-circle track formed in a second recording region adjacent to the first recording region shortens the distances from a certain concentrically circular track to each track of the spiral multitrack, thus enabling an optical pickup to quickly access a desired track at a track jump.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiment of this invention will be described with reference to the accompanying drawings:

(1) First Embodiment

Figure 1A:
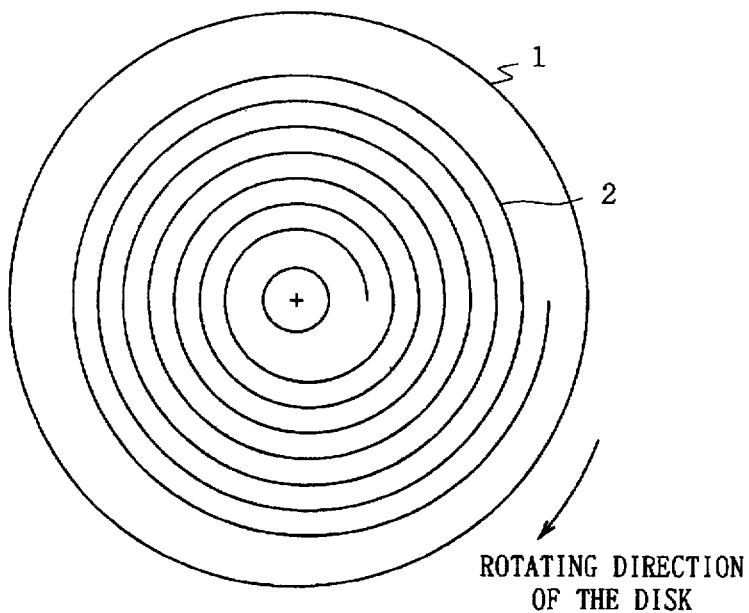
FIGS. 1A and 1B are schematic diagrams showing the structure of a conventional compact disk.
Figure 1B:
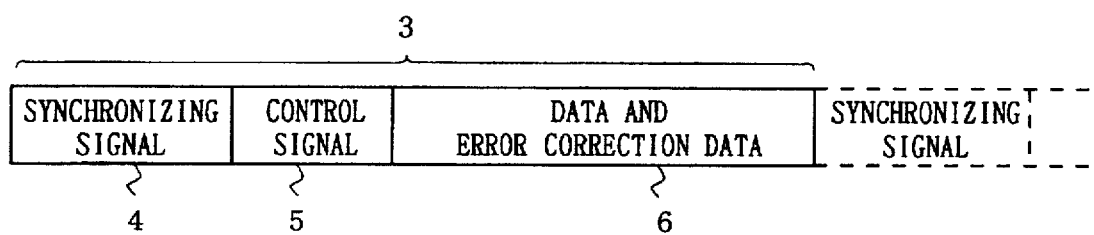
Figure 2:
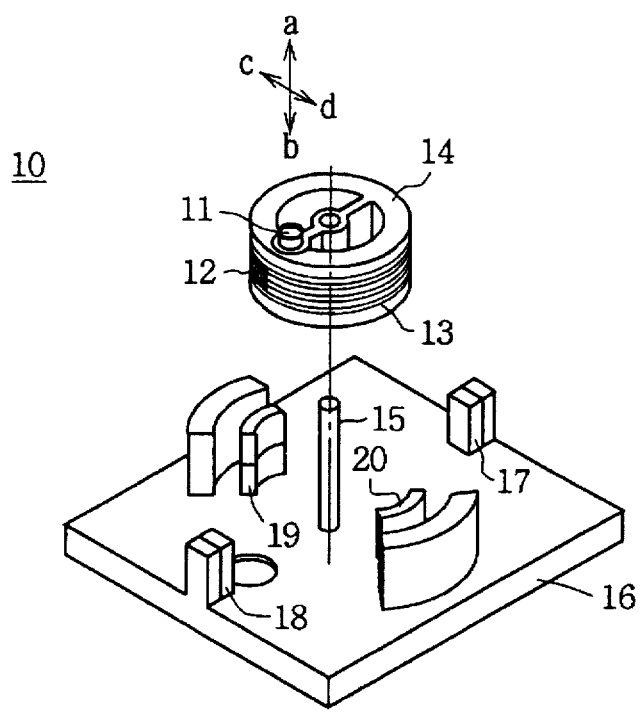
FIG. 2 is a schematic diagram showing the structure of a double-axis actuator.
Figure 3:
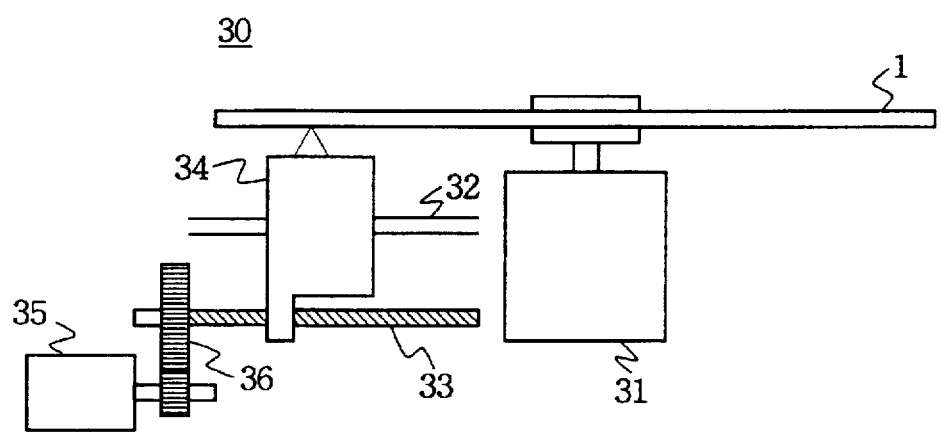
FIG. 3 is a schematic diagram showing the structure of a tracking servo mechanism.
Figure 4A:
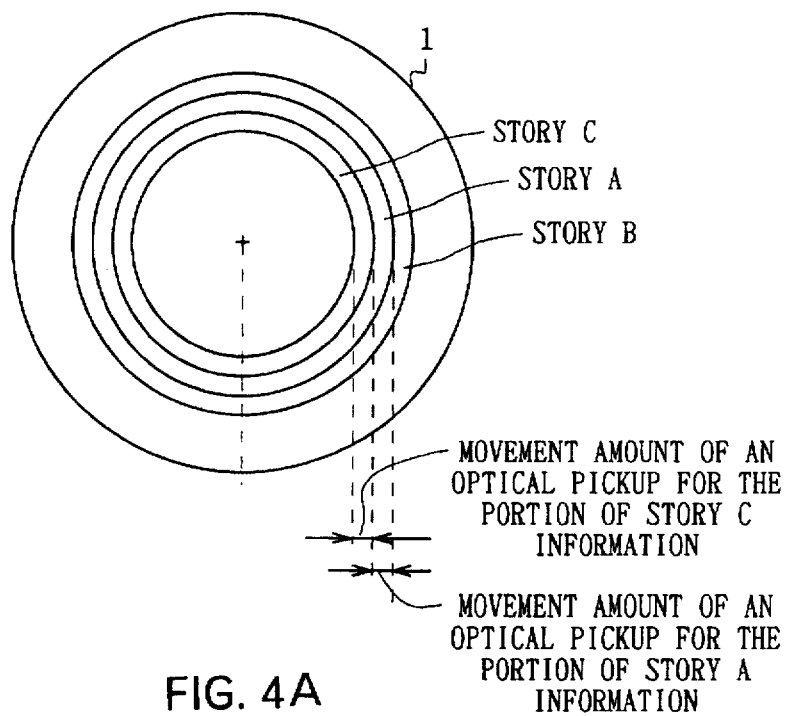
FIGS. 4A to 4C are schematic diagrams showing the movement Mount of an optical pickup in a conventional compact disk.
Figure 4B:
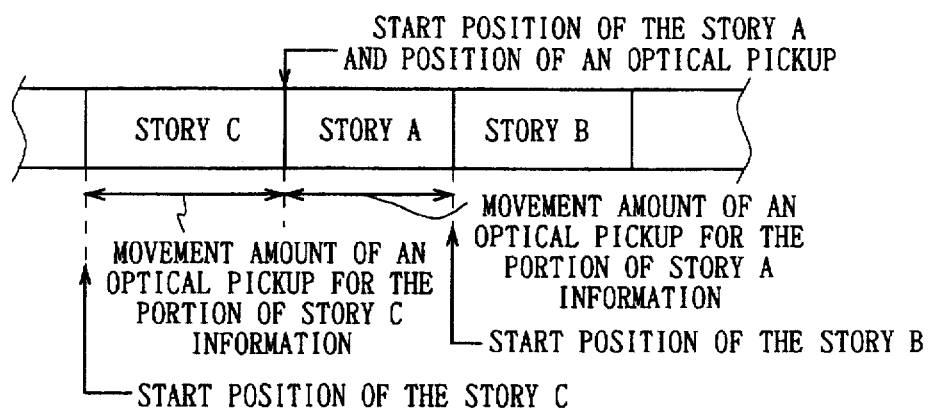
Figure 4C:
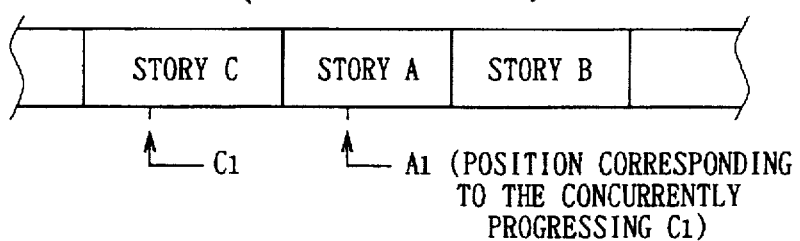
Figure 5A:
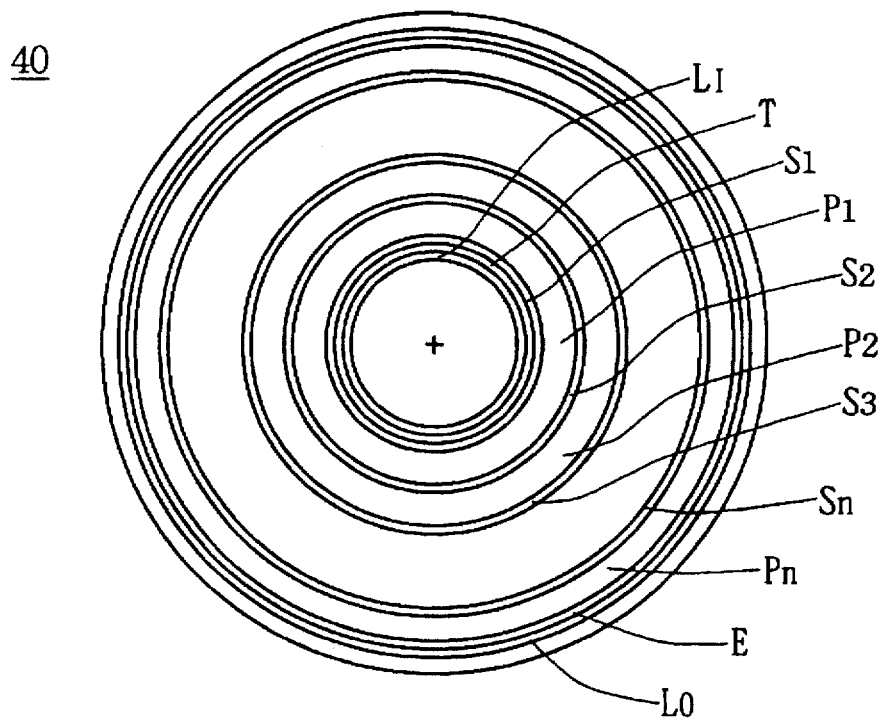
FIGS. 5A and 5B are schematic diagrams showing the structure of a compact disk according to a first embodiment.
Figure 5B:
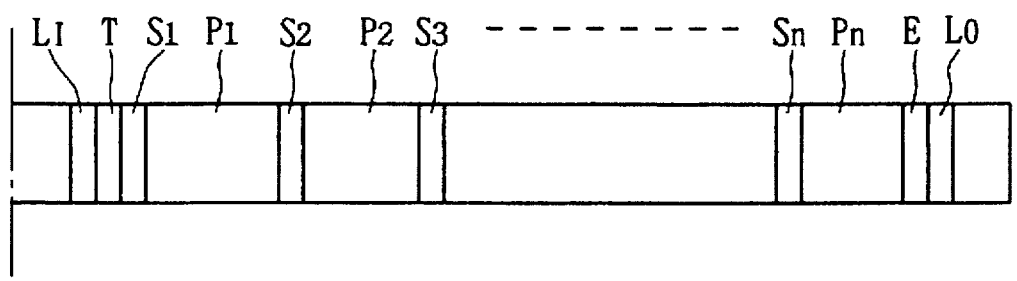

FIGS. 5A and 5B show the general structure of a compact disk 40 according to a first embodiment of this invention. The compact disk 40 comprises a lead-in area (hereinafter, referred to as LI area), a TOC area (hereinafter, referred to as T area), a scene area (hereinafter, referred to as Si area), a program area (hereinafter, referred to as Pi area), an end area (hereinafter, referred to as E area) and a lead-out area (hereinafter, referred to as Lo area) from the innermost circumference to the outermost circumference side in sequence.

Here, in the LI area, the head-address information for each area recorded on the compact disk 40 is recorded.

And in the T area, addresses and the contents of individual areas (Si area, Pi area and E area) constituting the whole information recorded in the compact disk 40 are recorded, while the information related to Pi area (i=1, 2, ... n), e.g., information about names and positions of individual programs and the total number of programs, and the position of the Si area to be accessed from each Pi area, are recorded in each Si area. In this manner, the compact disk 40 is made adaptable to great numbers of programs without need for an enlargement in the region of the TOC area.

Subsequently, in the Pi area, a plurality of programs or stories concurrently progressing or to be simultaneously selected are recorded.

Furthermore, in the E area, the information representing the end of the Pn area is recorded. Finally, in the Lo area, the tail-address information of individual areas recorded in the compact disk 40 is recorded.

In this case, each of the LI area, the T area, the Si area, the E area and the Lo area comprises one line of independent spiral track wound in the same direction within the respective region.

And each Pi area ($i=1, 2, \ldots n$) is independent for the respective region and comprises a spiral multitrack equal in number to programs or stories concurrently progressing or to be simultaneously selected and equal in track winding to the spiral track of the LI area.

Figure 6A:
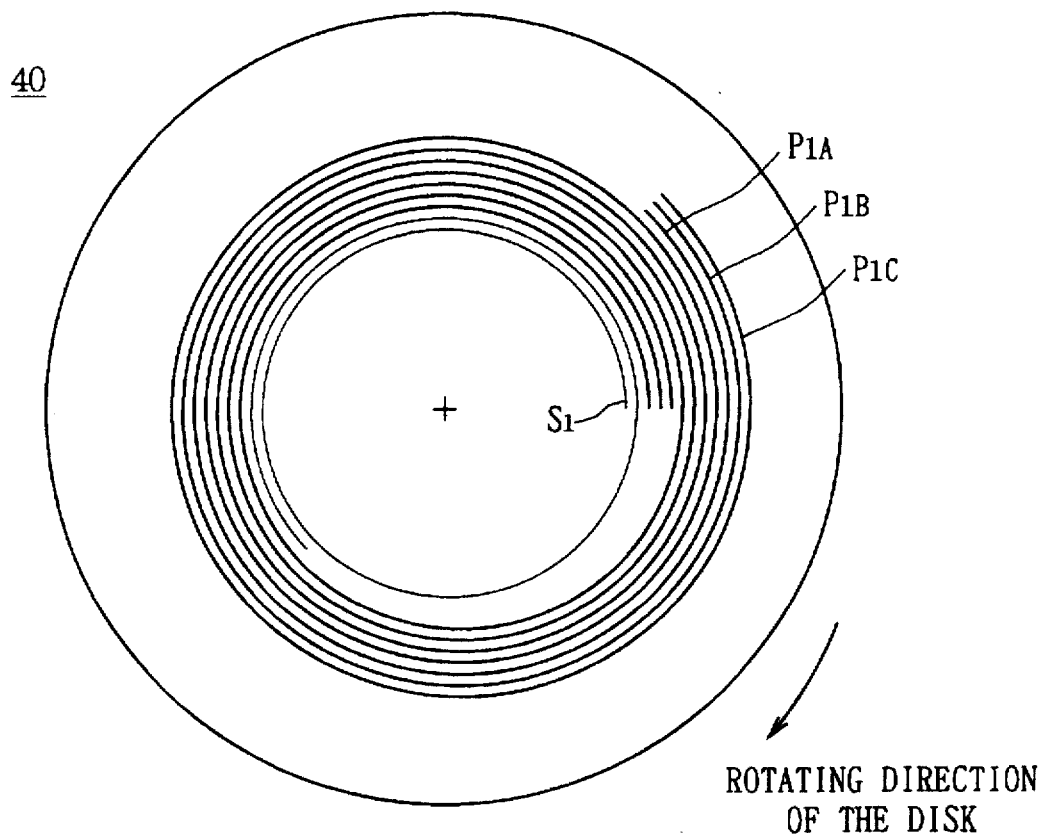
FIGS. 6A and 6B are schematic diagrams showing the structure of triple spiral track in a compact disk according to the first embodiment.
Figure 6B:
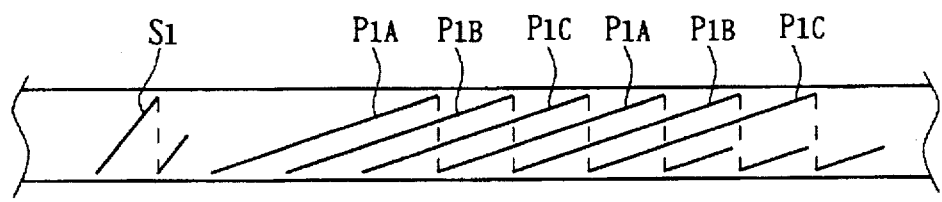

Next, for the purpose of easier understanding of the operation of the spiral track and spiral multitrack in this compact disk 40, description will be made by using the general structure drawing of the compact disk 40 of FIG. 6A and the simplified drawing of FIG. 6B showing the winding direction of tracks.

As shown in FIG. 6A and 6B, with this compact disk 40, the S1 area comprises a spiral track with a track pitch of about 1.6 µm and a rotating angle of more than 360°, while the P1 area is formed by winding a triple spiral track with a track pitch of about 4.8 µm and a rotating angle of more than 360°, comprising three tracks P1A, P1B and P1C with a track pitch of about 1.6 µm. In individual tracks P1A, P1B and P1C of this triple spiral track, programs different in contents are respectively recorded.

In practice, the manner of access to each Pi area of this compact disk 40 by the playback system is carried out as follows: for example, if the selection of individual tracks P1A, P1B and P1C of the P1 area is prearranged from the story development of the whole game program, the position of the S1 area is evaluated on the basis of pre-read information concerning the T area and the optical pickup 34 is so arranged as to access the S1 area by means of a fine feed mechanism by the double-axis actuator 10 or by means of the tracking servo mechanism 30.

Next, because the S1 area comprises a spiral track with a rotating angle of more than 360°, the optical pickup 34 returns to the first portion of the S1 area by a track jump after finishing the readout of the information of the S1 area, and waits for the selection of programs by a user while repeating the readout of the S1 area until the selection of programs by user is completed.

And after the selection of P1A (P1B, P1C) from among the programs P1A, P1B and P1C by a user is completed, the double-axis actuator 10 can cause a flux of light from the optical pickup 34 to access the head of the selected track P1A (P1B, P1C) by a track jump of about one track (about 2 tracks, about 3 tracks).

Accordingly, at the point of time when the selection of programs recorded in individual tracks P1A, P1B, P1C of the P1 area predetermined, the playback system is first made to access the S1 area by using the tracking servo mechanism. At this time, since, by composing each of the tracks P1A, P1B, P1C in a triple spiral, the distance from the S1 area to individual tracks P1A, P1B, P1C is made shorter, the playback system can always make the optical pickup 34 access the head of the track in which the selected program is recorded in a short time, regardless of whether the size of the P1 area region lies within the possible range of track jump by the double-axis actuator 10.

In addition, the track of the program selected and those of the programs not selected are always provided in parallel on a triple spiral track. Thus, when programs concurrently progressing are recorded in individual tracks P1A, P1B and P1C, switching from the track of the program selected to the track of a program not selected is executable at a track jump of within several tracks by the double-axis actuator 10 and moreover returning to the former track is executable.

Furthermore, when a new selection is required during readout of the track of the selected track, the playback system is arranged to on the basis of the T area information move the optical pickup 34 to the Si area in which the Pi area information corresponding to the request is recorded.

In addition, when the next selection was not requested till the readout of the track of the program selected is completed, the playback system is arranged to move the optical pickup 34 to the Si area next to the current Si area and get ready for the next selection. When readout of the program of the Pn area from the last Sn area is completed, the playback system moves the optical pickup 34 to the E area and get ready for the next selection.

In the above arrangement, individual Pi areas of the compact disk 40 are made independent of each other, each of which comprises spiral multitracks equal in number to programs or stories concurrently progressing or to be simultaneously selected and equal in track winding to the spiral track of the LI area. Consequently, the distance from the S1 area to individual tracks P1A, P1B, P1C of the P1 area is shortened, the double-axis actuator 10 permits a flux of light from the optical pickup 34 to quickly access each of the tracks P1A, P1B and P1C at a track jump and thus the playback system can switch screens or effect sounds in instantaneous response to a depressing of the selected control button.

According to the above arrangement, because each Pi area ($i=1, 2, \ldots n$) of the compact disk 40 is made to comprise spiral multitracks equal in number to programs or stories concurrently progressing or to be simultaneously selected, the distance from the Si area to each of spiral multitrack in the Pi area is shortened and thus a quick access of the optical pickup 34 can be accomplished at a track jump by the double-axis actuator 10.

(2) Second Embodiment

Figure 7A:
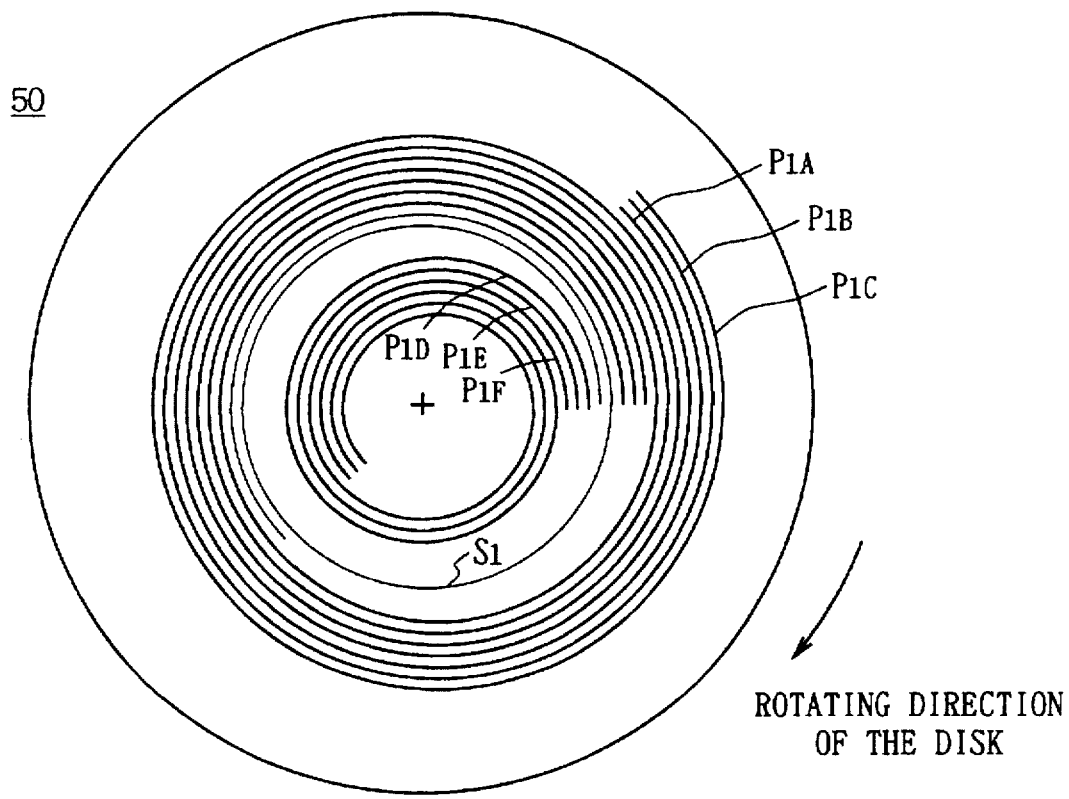
FIGS. 7A and 7B are schematic diagrams showing the structure of a compact disk according to a second embodiment.
Figure 7B:
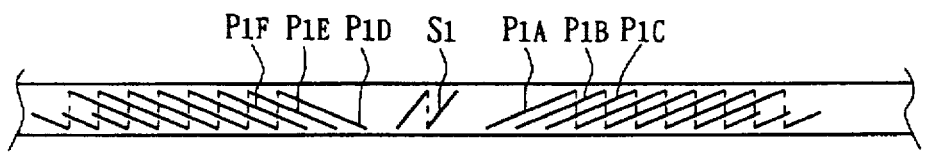

FIGS. 7A and 7B, in which like symbols are attached to those corresponding to parts in FIGS. 6A and 6B, show the structure of a compact disk 50 according to a second embodiment of the present invention. As with a compact disk 40 according to the first embodiment of the present invention, this compact disk 50 comprises an LI area, a T area, an Si area ($i=1, 2, \ldots n$), a Pi area ($i=1, 2, \ldots n$), an E area and an Lo area.

Here, the P1 area comprises a triple spiral track P1A, P1B, P1C and a triple spiral track P1D, P1E, P1F formed separately in areas adjacent to the S1 area.

In addition, the S1 area has common information shared between a triple spiral track P1A, P1B, P1C and a triple spiral track P1D, P1E, P1F, and the optical pickup 34 waits for the selection of a user while repeating the readout of information of this S1 area by track jumps.

The triple spiral track P1A, P1B, P1C corresponds in winding direction to the track of the S1 area and is wound counterclockwise toward the periphery. The triple spiral track P1D, P1E, P1F is equal in winding direction to the track of the S1 area and is wound counterclockwise but toward the center.

Accordingly, light from the optical pickup 34 advances from the inner side to the outer side for playback of a triple spiral track P1A, P1B, P1C and advances from the outer side to the inner side for playback of a triple spiral track P1D, P1E, P1F.

Thus, the optical pickup 34 is arranged to be easily accessible either to a triple spiral track P1A, P1B, P1C or to a triple spiral track P1D, P1E, P1F from the S1 area by a track jump of within three tracks.

In the above arrangement, the compact disk 50 is arranged to separate the P1 area, for example, into two oppositely directed areas adjacent to the S1 area so that six programs concurrently progressing or to be simultaneously selected are recorded on triple spiral track P1A, P1B, P1C and on triple spiral track P1D, P1C P1E, P1F, equal in winding direction and mutually opposite in the moving direction of an optical pickup 34. Accordingly, the distance from the S1 area to the triple spiral tracks P1A, P1B, and P1D, P1E, P1F is shortened, light from the optical pickup 34 can quickly access individual tracks P1A, P1B, P1C and P1D, P1E, P1F at a track jump by the double-axis actuator 10 and thus the playback system can switch screens or effect sounds in instantaneous response to a press of the selected control button.

In addition, with this compact disk 50, because six programs are recorded on two triple spiral tracks P1A, P1B, P1C and P1D, P1E, P1F equal in winding direction and mutually opposite in the moving direction of an optical pickup 34, the amount of track jump by the double-axis actuator 10 requires only a half of that required for a case where the programs are recorded only on one side adjacent to the S1 area as with the first embodiment, thereby enabling the optical pickup 34 to make a further quicker access.

According to the above arrangement, because the compact disk 50 has the P1 area comprising spiral multitracks equal in number to a plurality of programs or stories concurrently progressing or to be simultaneously selected and made to be separately provided in two area adjacent to the S1 area, opposite in winding, i.e., from the outer side to the outer side and from the outer side to the inner side, the distance from the S1 area to a triple spiral tracks P1A, P1B, P1C and P1D, P1E, P1F of the P1 area is shortened and thus a quick access of the optical pickup 34 can be effected at a track jump by the double-axis actuator 10.

(3) Third Embodiment

Figure 8:
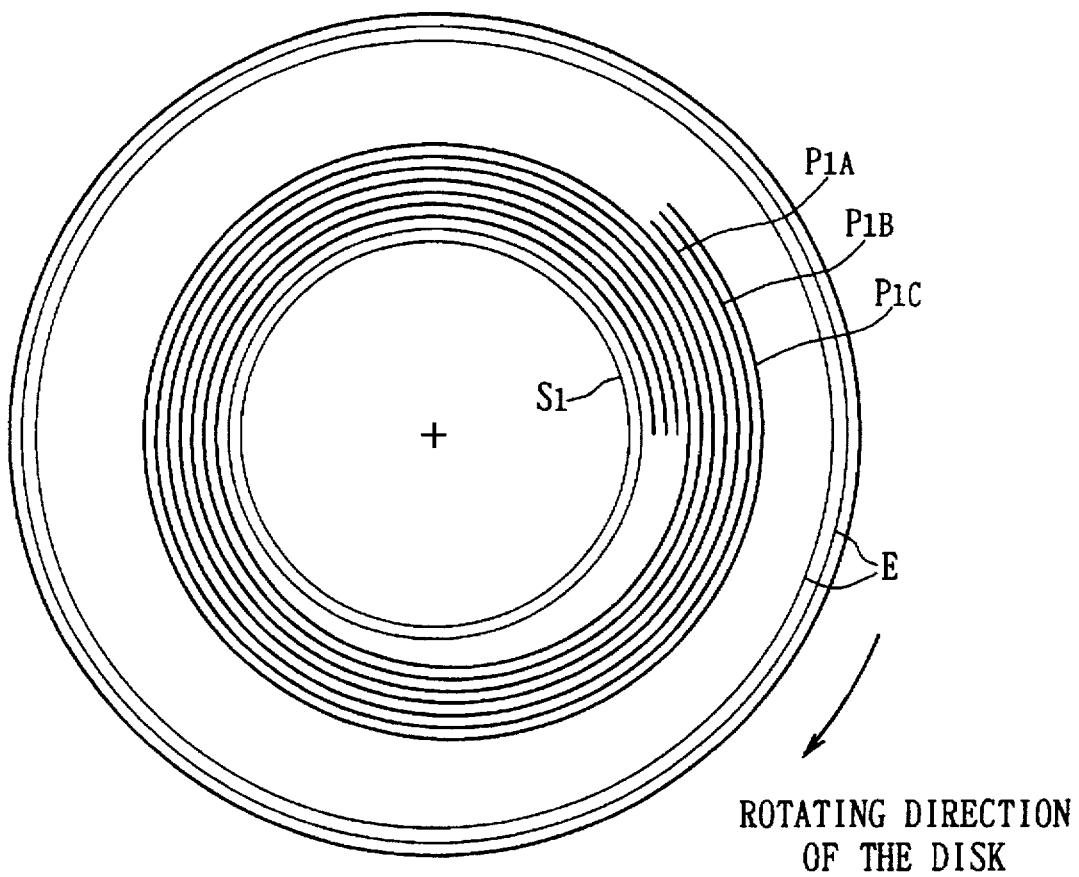
FIG. 8 is a schematic diagram showing the structure of a compact disk according to a third embodiment.

FIG. 8, in which like symbols are attached to those corresponding to parts in FIG. 6A, shows the structure of a compact disk 60 according to a third embodiment of the present invention. As with a compact disk 40 according to the first embodiment of the present invention, this compact disk 60 comprises an LI area, a T area, an Si area (i=1, 2, . . . n), a Pi area (i=1, 2, . . . n), an E area and an Lo area.

Here, the S1 area has common information of triple spiral tracks P1A, P1B, P1C and comprises a double concentrically circular, but not spiral, track. And similarly the E area also comprises a double concentric-circle, but not spiral, track. Accordingly, in the S1 area and the E area, the optical pickup 34 needs no track jump that was executed for a spiral track and is arranged to wait for the selection of a program from a user while repeating the readout of the S1 area.

In the above arrangement, because the compact disk 60 has an S1 area and an E area each comprising a double concentrical-circle, but not spiral, track, the S1 area and E area information can be read out without need for track jump that was necessary for the spiral track.

In addition, with this compact disk 60, because the number of tracks in the S1 area and E area is set to two, it is only necessary to access either one of the two concentrically circular tracks when the double-axis actuator 10 accesses the S1 area and the E area on the basis of the T area information. Consequently, the double-axis actuator 10 can reduce the occurrence of misoperations due to a track jump to a wrong track other than a desired track and the number of retrials after the misoperation is decreased, so that an access of the optical pickup 34 from the S1 area and the E area can be quickly made.

According to the above arrangement, because two concentrically circular, but not spiral, tracks are provided in the S1 area and the E area of a compact disk 60, an access to the S1 area and the E area becomes easier and thus the optical pickup 34 can be made to access the S1 area and the E area quickly at a track jump by the double-axis actuator 10.

(4) Other Embodiments

Incidentally, cases where an axial-slide type double-axis actuator 10 is employed was described in the first, second and third embodiments mentioned above, but the present invention is not limited to those. Various actuators other than the axial-slide type may be employed provided a track jump to a desired track can be made. Also in this case, a effectiveness similar to that of the embodiment mentioned above can be obtained.

In addition, in the first embodiment mentioned above, a case where triple spiral track corresponding to three programs was described, but the present invention is not limited to this and the number of tracks can be increased correspondingly to an increase in the number of programs.

Furthermore, in the third embodiment mentioned above, a case where tracks of the S1 area and the E area were two concentrically circular tracks was described, but the present invention is not limited to this and concentric-circle track comprising still greater number of tracks may be employed. By this arrangement, the double-axis actuator 10 can further reduce misoperations due to a track jump to a wrong track other than a desired track.

As mentioned above, according to the present invention, the provision of spiral multitrack formed by multiple winding of a plurality of tracks in a first recording region and concentric-circle track formed in a second recording region makes it possible to implement an optical recording medium in which the distance from the concentric-circle track to each track of the spiral multitrack is shortened, thus the optical pickup to access a desired track quickly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical recording medium comprising:
   a spiral multitrack formed by multiple windings of a plurality of tracks in a first recording region; and
   a spiral track formed with a turning angle of more than 360° in a second recording region adjacent to said first recording region.

2. The optical recording medium according to claim 1, wherein on individual tracks of said spiral multitrack, a plurality of items of information progressing simultaneously are recorded.

3. The optical recording medium according to claim 2, wherein
   on said spiral track, the common items of information to the respective items of information recorded on individual tracks of said spiral multitrack are recorded.

4. An optical recording medium comprising:
a spiral multitrack formed by multiple winding of a plurality of tracks in a first recording region; and
two concentrically circular tracks formed in a second recording region on one or both of the inner and the outer circumference sides enclosing said first recording region therebetween.

5. The optical recording medium according to claim 4, wherein
said concentric-circle track is composed of a plurality of tracks.

6. The optical recording medium according to claim 4, wherein on individual tracks of said spiral multitrack, a plurality of items of information progressing concurrently are recorded.

7. The optical recording medium according to claim 6, wherein
on said concentric-circle track, the common items of information to the respective items of information recorded on individual tracks of said spiral multitrack are recorded.

8. An optical recording medium comprising:
a first spiral multitrack formed with a plurality of tracks multiply wound in either a clockwise direction or a counter clockwise direction from the central side to the peripheral side in a first recording region; and
a second spiral multitrack formed with a plurality of tracks multiply wound in the same direction as the first spiral multitrack from the peripheral side to the central side in a second recording region; and
a spiral track formed with a turning angle of more than 360° in a third recording region interposed between said first recording region and said second recording region.

9. The optical recording medium according to claim 8, wherein on individual tracks of one or both of said first spiral multitrack and said second spiral multitrack, a plurality of items of information progressing simultaneously are recorded.

10. The optical recording medium according to claim 9, wherein
on said spiral track, the common items of information to the respective items of information recorded on individual tracks of one or both of said first spiral multitrack and second spiral multitrack are recorded.

11. The optical recording medium according to claim 1, wherein on individual tracks of said spiral multitrack, a plurality of items of information to be selected simultaneously are recorded.

12. The optical recording medium according to claim 11, wherein on said spiral track, the common items of information to the respective items of information recorded on individual tracks of said spiral multitrack are recorded.

13. The optical recording medium according to claim 4, wherein on individual tracks of said spiral multitrack, a plurality of items of information to be selected simultaneously are recorded.

14. The optical recording medium according to claim 13, wherein on said spiral track, the common items of information to the respective items of information recorded on individual tracks of said spiral multitrack are recorded.

15. The optical recording medium according to claim 8, wherein on individual tracks of either or both of said first spiral multitrack and said second spiral multitrack, a plurality of items of information to be selected simultaneously are recorded.

16. The optical recording medium according to claim 15, wherein
on said spiral track, the common items of information to the respective items of information recorded on individual tracks of one or both of said first spiral multitrack and second spiral multitrack are recorded.

* * * * *